(No Model.)
G. E. STRAUSS & E. KLAHN.
WHEEL HUB.
No. 576,000. Patented Jan. 26, 1897.
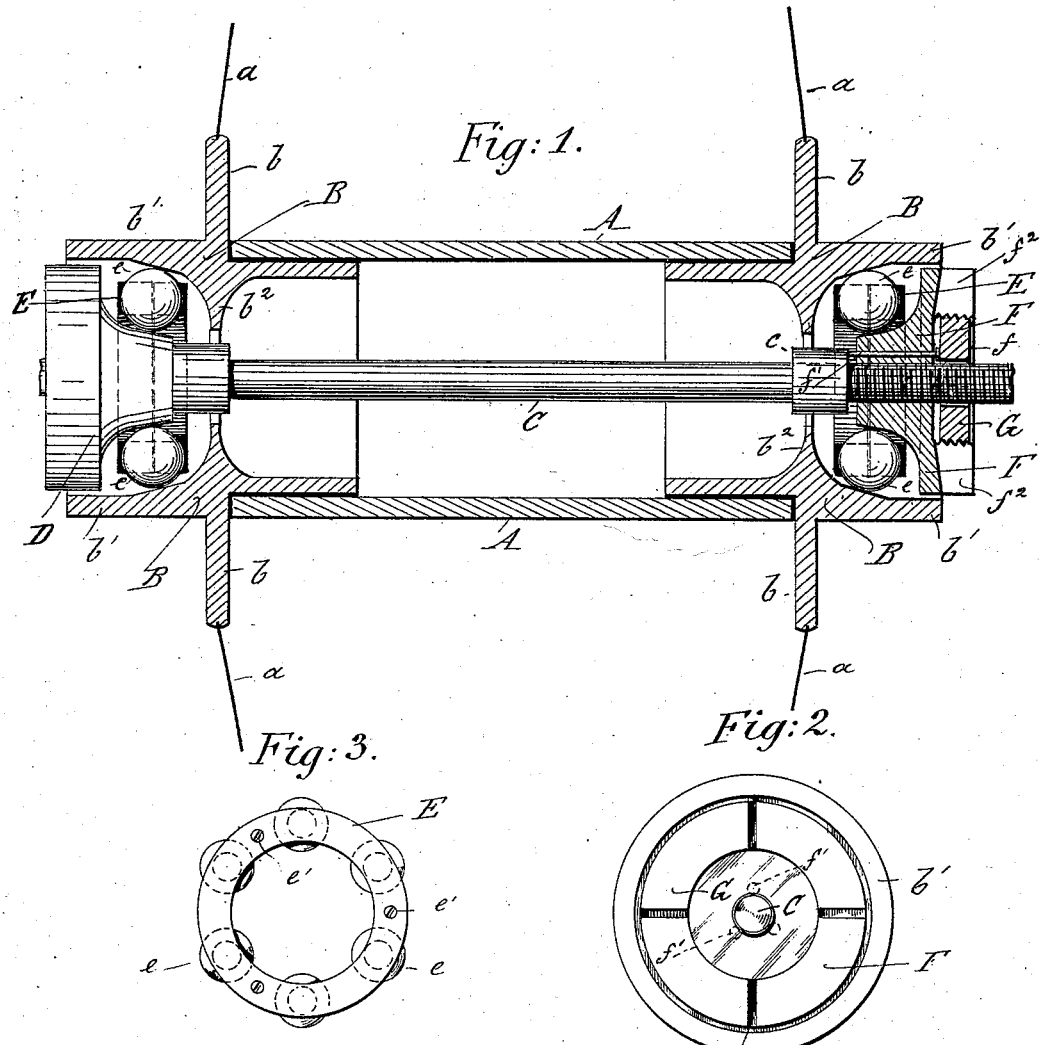

UNITED STATES PATENT OFFICE.

GUSTAVUS E. STRAUSS, OF NEW YORK, N. Y., AND EMIL KLAHN, OF WEST HOBOKEN, NEW JERSEY.

WHEEL-HUB.

SPECIFICATION forming part of Letters Patent No. 576,000, dated January 26, 1897.

Application filed September 15, 1896. Serial No. 605,993. (No model.)

*To all whom it may concern:*

Be it known that we, GUSTAVUS E. STRAUSS, of New York, county and State of New York, and EMIL KLAHN, of West Hoboken, county of Hudson, and State of New Jersey, citizens of the United States, have invented certain new and useful Improvements in Wheel-Hubs, of which the following is a specification.

Our invention has reference to improvements in hubs for vehicle-wheels, and is illustrated in the accompanying drawings, in which—

Figure 1 is a longitudinal section, and Fig. 2 an end view of the same, while Fig. 3 shows the device for holding the balls in the ball-chamber of the hub.

Similar letters of reference indicate corresponding parts.

A in the drawings represents a tube, and B B are the end sleeves of the hub, the inner ends of which are inserted into the ends of the said tube and reliably fastened thereto in any approved manner. The sleeves have each a flange $b$, projecting outwardly beyond the ends of the tube, and a lateral extension $b'$ in line with the outside of the tube. To the flanges $b$ the spokes $a$ of the wheel are attached. The inner portion of each sleeve has an inwardly-extending annular projection $b^2$, which is integral with the extension $b'$ and forms one curved or conical wall of the respective ball-chamber, said projection being substantially central of the length of the sleeve.

C is the axle, which has on one screw-threaded end an annular flange or shoulder $c$ and on the other end a cone D, which may be integral with the axle or screwed upon the same.

E E are annular washers holding the balls $e$ for the ball-bearings of the hub. Each washer consists of two flat rings of a like shape, as shown in Fig. 1, which are provided with excavations corresponding with each other in such a manner that when the balls are placed into the same and the two rings, forming one washer, fastened to each other by means of rivets or screws $e'$, Fig. 3, the balls are held in the said excavations, but project partially beyond the inner and outer rims of the washer.

F is a conical screw-nut which has on its top an annular excavation $f$, provided with a lateral screw-thread, and traversing-holes passing from the bottom of the excavation through the body of the screw-nut to the end portion of the same, into which traversing-holes pins $f'$ are inserted.

G is a second screw-nut fitting into the threaded excavation $f$ of the conical screw-nut F, which latter is provided with incisions $f^2$, reaching from the top of the same to the bottom of the said excavation, whereby a certain degree of spring action is imparted to the excavated portion of the conical screw-nut, which allows a more reliable fitting of the second screw-nut G in the excavation.

The hub is attached to the axle as follows: After one washer E, holding a series of balls, is placed upon the cone D the hub is pushed over the axle until the said washer is inclosed in the ball-chamber formed by the said cone and the conical inner wall of the extension $b'$ of the corresponding ring B, so that the cone and the said extension a ball-chamber is formed in which the balls come in contact with the walls of the chamber. Then the second washer E is pushed over the axle so that the balls in the same touch the inner conical wall of the second extension $b'$, and then the conical screw-nut F is screwed upon the threaded end of the axle until the conical surface of the screw-nut comes in contact with the said balls and a second ball-chamber is formed, whereafter the additional screw-nut G is screwed into the threaded excavation of the conical screw-nut, and thereby the pins $f'$ are pushed forward until they rest on the shoulder $c$ of the axle and the required contact of the balls with the inner balls of the ball-chambers is obtained.

Our improved hub is simple in the construction and cheap in the manufacture and can be quickly and easily attached to the axle. The washers holding the balls simplify the insertion of the balls into the ball-chambers and their removal from the same, while the special construction of the conical screw-nut secures a reliable contact of the balls with the walls of the ball-chambers.

Having thus described our invention, we claim as new and desire to secure by Letters Patent—

1. A hub for wheels comprising a tube and two end sleeves having each an inwardly-extending projection which is integral with the sleeve and forms therewith a curved or conical wall of a ball-chamber, said projection being substantially central of the length of the sleeve, the inner end of which is secured in the tube, in combination with an axle having on one end a cone, a conical screw-nut screwed upon the other end of the axle, and balls in the chambers, substantially as set forth.

2. The combination of a hub comprising a tube and two end sleeves inserted into the same and attached thereto, the sleeves having each an outwardly-extending flange, for bearing the spokes, and an extension forming with an inner flange a conical wall, with two washers composed of two flat rings provided with corresponding excavations and balls in the said excavations which project beyond the inner and outer rims of the washers, one washer being placed upon each inner conical wall of the said extensions of the sleeves, an axle having a flange and on one end a cone, a conical screw-nut screwed upon the other end of the axle and being provided with a threaded excavation, incisions in the excavated portion and traversing-holes, pins in the traversing-holes, and a second screw-nut in the excavation of the conical screw-nut pressing the said pins upon the flange of the axle, the cone and conical screw-nut and the inner conical walls of the sleeves inclosing the ball-bearing washers, substantially as shown and described.

Signed at New York, in the county of New York and State of New York, this 10th day of September, A. D. 1896.

GUSTAVUS E. STRAUSS.
EMIL KLAHN.

Witnesses:
CHAS. KARP,
ALFRED GINSBERG.